United States Patent
Gilbert et al.

(10) Patent No.: US 7,284,122 B2
(45) Date of Patent: *Oct. 16, 2007

(54) CRYPTOGRAPHIC METHOD FOR PROTECTION AGAINST FRAUD

(75) Inventors: Henri Gilbert, Bures sur Yvette (FR); Marc Girault, Caen (FR)

(73) Assignee: France Telecom, Paris (FR)

( * ) Notice: Subject to any disclaimer, the term of this patent is extended or adjusted under 35 U.S.C. 154(b) by 539 days.

This patent is subject to a terminal disclaimer.

(21) Appl. No.: 10/221,692

(22) PCT Filed: Mar. 19, 2001

(86) PCT No.: PCT/FR01/00808

§ 371 (c)(1),
(2), (4) Date: Feb. 26, 2003

(87) PCT Pub. No.: WO01/71675

PCT Pub. Date: Sep. 27, 2001

(65) Prior Publication Data

US 2003/0159038 A1    Aug. 21, 2003

(30) Foreign Application Priority Data

Mar. 22, 2000 (FR) ................................. 00 03684

(51) Int. Cl.
*H04L 9/00* (2006.01)
(52) U.S. Cl. ...................... 713/159; 380/263; 713/175
(58) Field of Classification Search ................. 713/159
See application file for complete search history.

(56) References Cited

U.S. PATENT DOCUMENTS

| | | | | |
|---|---|---|---|---|
| 5,128,997 A | | 7/1992 | Pailles | |
| 5,761,309 A | * | 6/1998 | Ohashi et al. | 713/156 |
| 5,862,224 A | * | 1/1999 | Gilbert et al. | 380/28 |
| 6,240,517 B1 | * | 5/2001 | Nishioka | 726/20 |
| 6,253,322 B1 | * | 6/2001 | Susaki et al. | 713/170 |
| 6,647,493 B1 | * | 11/2003 | Occhipinti et al. | 713/170 |

FOREIGN PATENT DOCUMENTS

| | | |
|---|---|---|
| DE | 4138861 | 1/1992 |
| EP | 0565279 | 10/1993 |
| EP | 0621570 | 10/1994 |
| WO | WO/9722093 | 6/1997 |

* cited by examiner

*Primary Examiner*—Emmanuel L. Moise
*Assistant Examiner*—Shewaye Gelagay
(74) *Attorney, Agent, or Firm*—Cohen Pontani Lieberman & Pavane LLP

(57) ABSTRACT

A cryptographic method of protection against fraud in transactions between an application and an electronic chip of a user. Both the electronic chip and the application compute a certificate (Sp, S) which is the result of applying a non-linear function f to a list of arguments ($e_1, e_2$) comprising at least a seed R and a secret key KO. A second secret key K' which is known only to the electronic chip and to the application is allocated to and kept secret in the electronic chip. Upon each authentication of the electronic chip, a mask M is determined by computing it from at least a portion of the secret key K'. The value of the certificate (Sp) is masked by means of the mask M to make available to the application only the masked value of the certificate (Spm). The application is used to verify the masked value of the certificate (Spm) computed by the electronic chip.

20 Claims, 1 Drawing Sheet

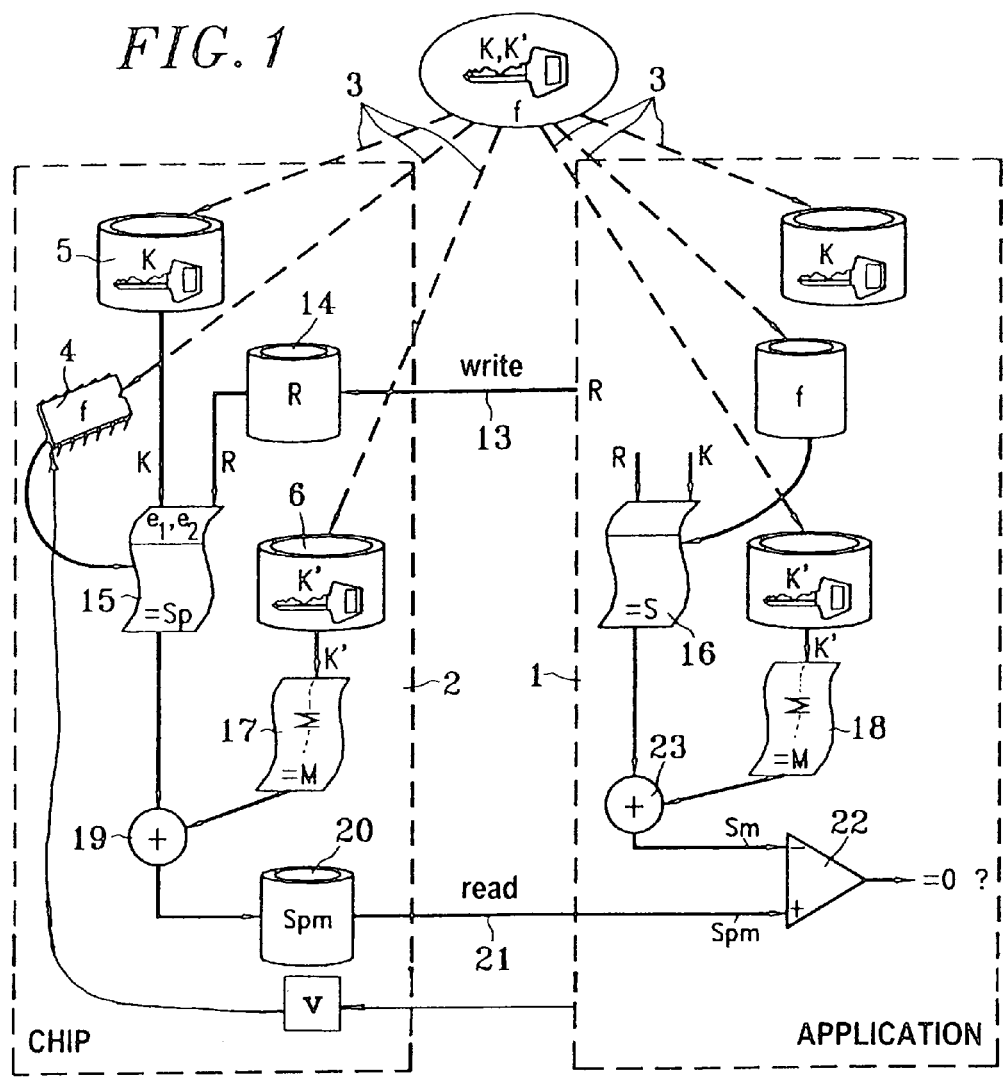
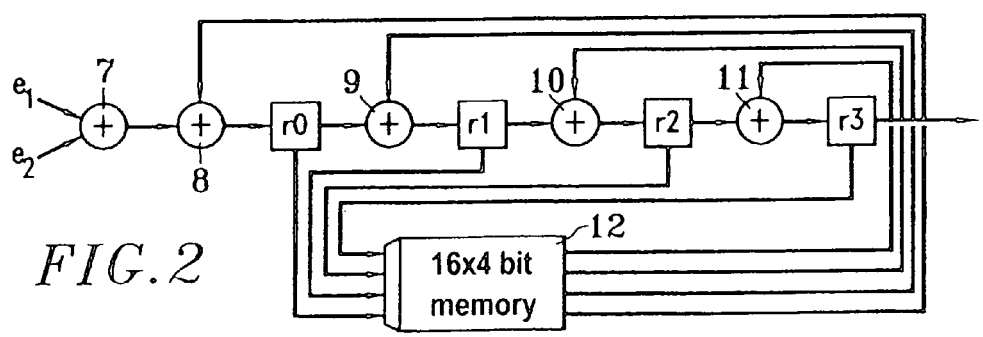

CRYPTOGRAPHIC METHOD FOR PROTECTION AGAINST FRAUD

This application is a U.S. National Phase Application under 35 USC 371 of International Application PCT/FR01/00808 (not published in English) filed 19 Mar. 2001.

FIELD OF THE INVENTION

The present invention relates to a cryptographic method for protecting an electronic chip against fraud.

The invention has one highly advantageous application in that it provides hardwired logic or microprocessor integrated circuit chips with protection against fraud, especially the chips incorporated in prepaid cards used in diverse transactions such as paying for telephone calls, for articles from automatic dispensers, for parking at parking meters, or for services such as public transport or infrastructure services (tolls, museum charges, library fees, etc.).

DESCRIPTION OF THE PRIOR ART

At present, prepaid cards are open to various types of fraud. A first type of fraud consists of unauthorized duplication of the card, often referred to as cloning. A second type of fraud consists of modifying the data associated with a card, in particular the amount of credit stored in the card. Cryptography is used to combat those kinds of fraud, both by authenticating the card and/or the data by means of a digital signature and also, and where appropriate, by encrypting the data to ensure confidentiality. Cryptography uses two entities, namely a verifier and an object to be verified, and can be either symmetrical or asymmetrical. When it is symmetrical, the two entities share exactly the same information, in particular a secret key. When it is asymmetrical, one of the two entities has a pair of keys, one of which is secret and the other of which is public; there is no shared secret key. In many systems only symmetrical cryptography is used for prepaid cards because asymmetrical cryptography is as yet slow and costly. The first authentication mechanisms developed for symmetrical cryptography compute a certificate once and for all, which certificate is different for each card, store it in the memory of the card, read it on the occasion of each transaction, and verify it by interrogating an application of the network supporting the transaction and which has certificates that have already been allocated stored therein. Those mechanisms provide insufficient protection, both because the certificate can be misappropriated, reproduced, and replayed fraudulently, since it is always the same for a given card, and also because the cards can be cloned. To combat cloning, passive card authentication mechanisms are replaced with active authentication mechanisms which can further ensure data integrity. A first of those mechanisms is the subject matter of [French patent FR 89 09734] U.S. Pat. No. 5,128,997. The method described therein consists in determining a non-linear function which is known to the application and installed in an electronic chip in the form of a state automaton. When performing an authentication, the electronic chip and the application compute a certificate which is the result of applying the function to a list of arguments determined on each authentication; the list of arguments can include a random seed which is a data item determined by the application on each authentication, a data item contained in the electronic chip, and a secret key known to the electronic chip and to the application. If the certificate computed by the electronic chip is identical to the certificate computed by the application, the electronic chip is deemed to be authentic and the transaction between the electronic chip and the application is authorized. A second mechanism for protecting cards by active authentication and that is unconditionally secure, relies on using a limited number of authentications and is based on a linear function that ensures protection against replaying and against controlled wear of the secret key. This mechanism is the subject matter of [French patent FR 95 12144] U.S. Pat. No. 5,862,224.

However, each of the two above-cited mechanisms has its own advantages and disadvantages. With regard to the first mechanism, which is based on the hypothesis that the non-linear function used is secure (which cannot be proved in the current state of knowledge), the very severe constraints imposed by the limited computation capacity of hardwired logic chips do not afford a safety margin that is as wide as that for the usual secret key algorithms, and disclosure of the detailed specification of the non-linear function used can therefore represent a risk. With regard to the second mechanism, it has the advantage of proven security provided that the number of authentications does not exceed a particular threshold, and there is therefore no risk associated with disclosure of the linear function used; however, the necessity for a strict limit on the number of uses of the authentication function over the service life of the chip (or between two recharging operations in the case of rechargeable cards), which limitation is inherent to the second solution, can represent a constraint that is difficult to satisfy in some applications. Additionally, attacking the security modules used to verify the hardwired logic chips, instead of attacking the chips themselves, by the verification modules until a sufficient number of good responses is obtained by chance, thereby revealing to the perpetrator of the fraud the secret associated with a card number of his choice, may be more difficult to counter in the case of the second mechanism.

SUMMARY OF THE INVENTION

Accordingly, the technical problem to be solved by the subject matter of the present invention is that of proposing a cryptographic method of protecting an electronic chip against fraud, which method comprises the following steps:

determining a non-linear function f known to the application and implanted in the electronic chip, allocating to the electronic chip a first secret key K known only to the electronic chip and to the application and kept secret in the electronic chip, on each authentication of the electronic chip, generating a variable input word R referred to as a random seed, and computing by both the electronic chip and the application a certificate which is the result of applying the non-linear function f to a list of arguments comprising at least the seed R and the secret key K, which method enhances security, retaining the advantages of the above-mentioned mechanisms and avoiding some or all of their disadvantages.

According to the invention, a solution to the stated technical problem is for said method to further comprise the following steps:

allocating to the electronic chip a second secret key K' known only to the electronic chip and to the application and kept secret in the electronic chip, on each authentication of the electronic chip, determining a mask M computed from at least a portion of the secret key K', masking the value of the certificate by means of the mask M to make available to the application only the masked value of the certificate, and using the application to verify the masked value of the certificate computed by the electronic chip.

Thus the method of the invention, which relates to protection against fraud in transactions between an electronic chip and an application, masks the value of the certificate S computed by the electronic chip before the application reads it to verify its value and authenticate the electronic chip; computing the certificate S and determining the mask M respectively employ a first key and a second key which are kept secret in the electronic chip and are known to the application.

The method of the invention solves the stated problem, firstly because the value of the certificate S is protected by masking, so that the security of the active authentication method of the invention is based on security assumptions that are much less critical than would be the case if the value of the certificate S were not protected by masking, and secondly because the use of a secure non-linear function means that the protection of the secrets used can be extended beyond the threshold at which their unconditional security is compromised.

The application verifies the accuracy of the masked value either by unmasking the masked certificate computed by the electronic chip by means of a function that is the inverse of the masking function and comparing the unmasked value with the value of the certificate computed by the application or, when the values of the certificate S and the mask M have been computed, by using the mask M to mask the value of the certificate S and comparing the masked value with the value computed by the electronic chip. If the compared values are identical, the electronic chip is deemed to be authentic and the transaction between the chip and the application is authorized.

One particular embodiment has the advantage that it simultaneously authenticates the card and authenticates data by using the value of some of the data when computing the certificate. In a first case, this data may be stored in memory in the electronic chip and may consist of the number of the electronic chip or a credit associated with the chip. In a second case, this data is written into the chip by the application during the authentication operation.

In one particular embodiment, a key may be determined by applying a diversification method whose input arguments are the number of the electronic chip and a master secret code, which has the advantage that the application can reconstitute the secret keys of each electronic chip after reading the number of the chip; it is not necessary to store the secret keys of the chips.

The keys are allocated to an electronic chip either while customizing the chip at the end of its manufacturing process or while recharging the chip in the case of a rechargeable chip. Although it is preferable to use independent keys K and K', there can be a dependency link between the first key K and the second key K' of an electronic chip; this connection can take the form of a function for computing the key K' from the key K or the key K from the key K'.

In one particular embodiment, the key K' is a word comprising a particular number of bits grouped in sequence; each sequence comprises a number of bits equal to the number of bits that constitute the mask M. The mask M is determined by selecting one of these sequences, a different one being chosen for each authentication operation. The selection can be effected by pointing to the sequences by means of a pointer that is positioned by the value of a counter located in the chip or by the value of a parameter supplied by the application during authentication. In another embodiment, each bit constituting the mask M is equal to a linear combination modulo 2 of bits of the key K', the combination being computed on each authentication operation, both by the application and also by the chip.

BRIEF DESCRIPTION OF THE DRAWINGS

Other features and advantages of the invention become apparent in the following description of particular embodiments of the invention, which description is given with reference to the accompanying drawings, which are provided by way of non-limiting example.

FIG. 1 is a block diagram representing a method of the invention.

FIG. 2 is a block diagram representing a non-linear function f.

DESCRIPTION OF AN EMBODIMENT

FIG. 1 is a diagram showing a cryptographic method of the invention for providing protection against fraud in transactions between an application 1 and an electronic chip 2 of a user.

The application 1 can be entirely or partly located in a non-supervised self-service terminal, such as a public telephone or a turnstile controlling access to a public transport facility. The user holds an electronic chip 2, which is implanted in a prepaid card, for example, which enables the user to set up a transaction with the application 1. These transactions can consist in paying for telephone calls, for articles from an automatic dispenser, for parking at a parking meter, or for a service such as a public transport or an infrastructure service.

The method authenticates either the electronic chip 2 or the application 1. In the event of fraud, the perpetrator either falsifies the electronic chip 2, by cloning it, or else falsifies the application 1, by using a fake terminal.

The electronic chip 2 is customized at the time of its manufacture, and where applicable when recharging it, by means of an identification number i and an initial value of a data item D tied to the application 1 for which the chip is intended; the value D generally represents a credit assigned to the electronic chip 2 for a given application 1.

The method consists in determining (3) the initial conditions necessary for authenticating either the electronic chip 2 or the application 1, either during customization or during some other operation prior to selling the electronic chip to the user. These initial conditions involve determining a non-linear function f, a first secret key K and second secret key K'. The non-linear function f is known to the application 1 and is implanted in the electronic chip 2 in the form of electronic circuits 4 or in the form of a program in the case of electronic chips incorporating a microprocessor. The first key K and the second key K' are stored secretly in respective memories 5 and 6 of the electronic chip 2.

The non-linear function f can be implanted in the form of a succession of registers forming a shift register and associated with a memory and with exclusive-OR operators; this kind of function is referred to as a "state automaton", and one example of this kind of function is shown in FIG. 2. In this example, the function f consists of a first exclusive-OR operator 7, a 4-bit shift register comprising four flip-flops r0, to r3 and four exclusive-OR operators 8 to 11, and a memory 12 with a size of 16×4 bits. Each exclusive-OR operator 7 to 11 has two inputs and one output. Each flip-flop r0 to r3 has one data input, two data outputs and a clock input, not shown. The memory 12 has four inputs and four outputs and a clock input, not shown. The input arguments $e_1$, $e_2$ comprise at least the first secret key K and a second value R and they are present at one of the inputs of the first exclusive-OR operator 7. The output of the first exclusive-OR operator 7 is connected to the first input of the second exclusive-OR operator 8. The input of each of the flip-flops r0, r1, r2, and r3 is connected to the output of an exclusive-OR operator 8 to 11. A first output of each of the flip-flops r0, r1, and r2 is connected to a first input of an exclusive-OR operator 9 to 11. A second output of each of the flip-flops r0, r1, r2, and r3 is connected to an input of the memory 12. A second input of each of the exclusive-OR operators 8 to 11 is connected to an output of the memory 12. The first output of the flip-flop r3 gives the value of the certificate S computed by the function f applied to the arguments $e_1$, $e_2$ which comprise at least the first secret key K and a second value R. To each authentication of the electronic chip 2 or of the application 1 there corresponds a number of clock pulses equal to the number of bits of the input arguments $e_1$, $e_2$; the bits of the result S are fed out serially on each clock pulse.

The first key K, which is generally allocated individually to an electronic chip 2, typically consists of a word comprising 64 to 128 bits; this word is known to the application 1 and is kept secret 5 in the electronic chip 2. Nevertheless, in one particular embodiment of the method, the application 1 does not store the key K itself, but instead stores a master secret. This master secret enables the key K to be reconstituted from the identification number i of the electronic chip 2 by a so-called diversification method.

Whichever embodiment of the method is used, the key K is typically held in the electronic chip 2 in a read-only memory 5 such as a PROM. In particular, if the electronic chip 2 is rechargeable, which is the case for an electronic chip 2 implanted in a rechargeable prepaid card, the read-only memory 5 is a memory that can also be written, such as an EEPROM.

Like the key K, the second key K' takes the form of a word with a particular number of bits. The keys K and K' are stored in the electronic chip 2, either in the same memory at different addresses or in two separate memories 5, 6, and in some cases the determination of the bits of K' can depend on the key K, or those of K can depend on K'.

After the customization operation, the electronic chip 2 is sold to the user, who can enter into a transaction with an application 1. Two situations can arise, depending on whether authentication entails authentication of the electronic chip 2 by the application 1 or authentication of the application 1 by the electronic chip 2.

FIG. 1 corresponds to the first-mentioned situation. In this case, the application 1 seeks to determine if the electronic chip 2 is authentic or not, since it may be a clone of an electronic chip 2.

In a first step of the method, the application 1 generates a word R referred to as a random seed. The word R comprises a number of bits determined to prevent any attempt at fraudulent replaying; the number of bits is typically of the order of several tens of bits. The word R is generated by means of a random generator or a pseudo-random generator. In one particular embodiment, the successively generated words R can consist of a series of predictable consecutive integers. The word R is an input argument for computation of the certificate Sp, S by the electronic chip 2 and by the application 1. For the electronic chip 2 to have access to the word R, either the application 1 performs a write operation 13 in the electronic chip 2 or the electronic chip 2 reads the word R in the application 1. Communication between the electronic chip 2 and the application 1 can conform to a protocol established when customizing the electronic chip 2; the value R can be encoded, for example. The word R is stored temporarily in a buffer memory 14 of the electronic chip 2 and in the application 1.

In a second step of the method, both the application 1, and the electronic chip 2 compute (15, 16) respective certificates S and Sp. The certificate S, or Sp as the case may be, is the result of the computation effected by applying the non-linear function f to a list of arguments $e_1$, $e_2$ which comprise at least the seed R and the key K. In particular embodiments of the method, the list of arguments $e_1$, $e_2$ further comprises the identification number i of the chip, the value of a data item D contained in the chip, the value of a data item D' generated by the application and written into the chip prior to authentication, or a combination of the above arguments.

In a third step, the method determines (17, 18) a mask M from at least a portion of the key K'. The mask M comprises a particular number m of bits, which number is typically equal to around ten bits. The number of bits in the mask M is preferably the same as the number of bits in the certificate S, to mask the certificate S completely and not reveal any information on the certificate S. M can be determined in various ways. In a first embodiment, M is determined by selecting m successive bits of the key K' and, after each authentication, shifting the rank of the first bit selected by an amount m. Accordingly, on the first authentication, the mask M comprises the bits $b_0$, $b_1$, . . . , $b_{m-1}$ and on the next authentication the mask M comprises the bits $b_m$, $b_{m+1}$, . . . , $b_{2m-1}$, where $b_0$, $b_1$, . . . , $b_{n-1}$ are the bits of the key K'. In a second embodiment, M is determined by combining bits of the key K'; for example, if $m_0$, $m_1$, . . . , $m_{m-1}$ are the bits of M, if $b_0$, $b_1$, . . . , $b_{n-1}$ are the bits of the key K', and if the seed R can be divided into m words of n bits each, $R_0 = r_{0,0}, r_{0,1}, \ldots, r_{0,n-1}$, $R_1 = r_{1,0}, r_{1,1}, \ldots, r_{1,n-1}$: $R_{m-1} = r_{m-1,1}, \ldots, r_{m-1,n-1}$, then: $m_i = (b_0, r_{i,0} + b_1, r_{i,1} + \ldots, + b_{n-1}, r_{i,n-1})$ mod2. In a third embodiment, which is a generalization of the first embodiment referred to above, M is determined by determining a parameter c selecting a sequence of bits of the key K' by using c to point to the bits of K'. This means the key K' must be considered as a series of sequences of bits. Accordingly, if $m_0$, $m_2$, . . . , $m_{m-1}$ are the bits of M and if K' is a series of sequences of m bits, K' can be represented in the form of a table:

| $b_0$ | $b_m$ | . . . | $b_{n-m}$ |
|---|---|---|---|
| . . . | . . . | . . . | . . . |
| $b_{m-1}$ | $b_{2m-1}$ | . . . | $b_{n-1}$ | and the content of a column can be represented by the m-bit word K' [i], where i=1 to n/m. Under these conditions, M is equal to K' [c] where c is a parameter in the range [1, n/m]. In a first embodiment, the value of the parameter c is determined by the value of a counter implanted in the chip which is incremented each time that the chip is authenticated and the application obtains access to the value of the counter by reading the chip. In a second embodiment, the value of the parameter c depends simultaneously on the value of a counter implanted in the chip which is incremented on each authentication of the chip and on the value of the seed R, for example. The value of c can also depend on the value D, the value D' or the identification number i of the chip.

In a fourth step of the method, the electronic chip 2 masks (19) the value of the certificate Sp that it has computed (17) by means of the mask M. In a first embodiment, the masking step 19 uses an encryption function. An encryption function is a one-to-one function whose parameters are set by a key which matches one set of values to another set of values; for example the function F: x→x+k modulo 2, where x=0 or 1 and k=0 or 1, can be used as the encryption function. The encryption function can consist of an exclusive-OR operation between the certificate Sp and the mask M. The result of the masking operation is the masked value of the certificate Spm which is stored temporarily in a buffer memory 20 of the electronic chip 2.

In a fifth step of the method, the application 1 reads (21) the buffer memory 20 or the electronic chip 2 writes the masked certificate Spm into the application 1. Communication 21 between the electronic chip 2 and the application 1 can conform to a protocol similar to that used to communicate the seed R. The application 1 then verifies the masked value of the certificate Spm computed by the electronic chip 2 by comparing it (22) to the value S of the certificate that it has itself computed (16). To effect the comparison step 22, either the application 1 masks (23) the value S by means of the mask M that it has previously computed (18) to obtain a masked value Sm and to compare it (22) with the value Spm as shown in FIG. 1, or the application unmasks the value Spm using a function which is the inverse of the masking function to obtain the value Sp and compare it with the value S.

One particular embodiment of the method limits the number of authentications that can be effected for the same electronic chip. This limitation advantageously protects electronic chips against a form of fraud which exploits the observation of a number of authentications greater than that which is required by the application. In this embodiment, the chip stores a number V determined as a function of the application and equal to the maximum number of authentications of the chip. At the time of an authentication operation, the requested transaction is prohibited if the chip has previously been authenticated V times. To monitor the number of authentications already effected, the chip typically contains a counter which is incremented on each authentication operation. When the counter reaches the value V, it triggers internal locking of the chip to prevent it effecting any further certificate computation. Without the certificate value computed by the chip, verification of the certificate by the application fails and consequently the application prohibits the transaction with the chip.

A variant of the method described above with reference to FIGS. 1 and 2 advantageously remedies certain attempts at piracy by simulating the behavior of an application relative to a chip by means of authentication of the application by the chip. In this variant, operations previously effected by the application are effected by the electronic chip and vice-versa versa. Accordingly:

on each authentication of the application, the input word R referred as a seed is generated by the electronic chip and not by the application, the mask M is determined on both sides on each authentication of the application, the application computes a certificate and masks it by means of the mask M to make available to the electronic chip only the value of the masked certificate, and the operation of comparing certificate values computed firstly by the electronic chip, and secondly by the application, is effected by the chip.

The invention claimed is:

1. A cryptographic method of providing protection against fraud in transactions between an application (1) and an electronic chip (2) of a user, the method comprising the following steps:

determining a non-linear pseudo random function f known to the application (1) and implanted (4) in the electronic chip (2), allocating to the electronic chip (2) a first secret key K known only to the electronic chip (2) and to the application (1) and kept secret (5) in the electronic chip (2), on each authentication of the electronic chip (2), generating a variable input word R referred to as a random seed, computing (15,16) by both the electronic chip (2) and the application (1) a certificate (Sp, S) which is the result of applying the non-linear pseudo random function f to a list of arguments ($e_1$, $e_2$) comprising at least the seed R and the secret key K, allocating to the electronic chip (2) a second secret key K' known only to the electronic chip (2) and to the application (1) and kept secret (6) in the electronic chip (2), on each authentication of the electronic chip (2), determining (17, 18) a mask M computed from at least a portion of the secret key K', masking (19) the value of the certificate (Sp) by means of the mask M to provide a second layer of security such that only the masked value of the certificate (Spm) is made available to the application (1), and using the application (1) to verify the masked value of the certificate (Spm) computed by the electronic chip (2).

2. A method according to claim 1, wherein verification by the application (1) of the masked value of the certificate (Spm) computed by the electronic chip (2) comprises:

using the mask M to unmask the masked value of the certificate (Spm) computed by the electronic chip (2), and comparing the value of the certificate (Sp) computed by the electronic chip (2) with that (S) computed by the application (1).

3. A method according to claim 1, wherein verification by the application (1) of the masked value of the certificate (Spm) computed by the electronic chip (2) comprises:

using the mask M to mask (23) the value of the certificate (S) computed by the application (1), and comparing (22) the masked value of the certificate (Sp) computed by the electronic chip (2) with the masked value of the certificate (Sm) computed by the application (1).

4. A method according to claim 1, wherein the seed R is determined by the application (1) from a random number generated by the application (1) and wherein the seed R is transmitted to the electronic chip (2) by the application (1).

5. A method according to claim 1, wherein the seed R is determined from a series of consecutive integers generated by the application (1) and by the electronic chip (2).

6. A method according to claim 1, wherein the certificate (Sp, S) is the result of applying the non-linear pseudo random function f to a list of arguments ($e_1$, $e_2$) comprising at least the seed R, the secret key K, and data D internal to the electronic chip.

7. A method according to claim 1, wherein the certificate (Sp, S) is the result of applying the non-linear pseudo random function to a list of arguments ($e_1$, $e_2$) comprising at least the seed R, the secret key K, and data D' supplied to the electronic chip (2) by the application (1) at the time of authentication.

8. A method according to claim 1, wherein the secret keys K and K' are chosen independently of each other.

9. A method according to claim 1, wherein said second secret key K' consists of a sequence of values K', M is equal to a linear combination modulo 2 of the bits of the values K', and the characteristics of the combination are determined at the time of authentication.

10. A method according to claim 1, wherein said second secret key K' consists of a sequence of values K' and M is equal to values K' from among the values K' and determined by the choice of a parameter c at the time of authentication.

11. A method according to claim 10, wherein the value of the parameter c is computed from at least the value of a counter in the electronic chip which is incremented on each authentication.

12. A method according to claim 10, wherein the value of the parameter c is computed from at least the seed R and the value of a counter in the electronic chip which is incremented on each authentication.

13. A method according to claim 1, wherein the masking of the certificate S by means of the mask M is computed by means of an encryption function (F).

14. A method according to claim 13, wherein the encryption function (F) is an exclusive-OR operation applied bit by bit.

15. A method according to claim 1, wherein the certificate (Sp, S) and the mask M have the same number of bits.

16. A method according to claim 1, wherein the number of authentications of the electronic chip (2) is limited to a maximum value V determined by the application (1) and written into the electronic chip (2).

17. A method according to claim 16, wherein the electronic chip (2) contains a counter which is incremented on each authentication and the electronic chip (2) terminates all authentication computation if the value of the counter reaches the maximum value V.

18. A cryptographic method of providing protection against fraud in transactions between an application (1) and an electronic chip (2) of an user, the method comprising the following steps:

determining a non-linear pseudo random function f known to the application (1) and implanted (4) in the electronic chip (2), allocating to the electronic chip (2) a first secret key K known only to the electronic chip (2) and to the application (1) and kept secret (5) in the electronic chip, on each authentication of the application (1), generating an input word R referred to as a random seed, computing by both the electronic chip (2) and the application (1) a certificate (Sp, S) which is the result of applying the non-linear pseudo random function f to a list of arguments ($e_1$, $e_2$) comprising at least the seed R and the secret key K, allocating to the electronic chip (2) a second secret key K' known only to the electronic chip (2) and to the application (1) and kept secret (6) in the electronic chip (2), on each authentication of the application (1), determining a mask M computed from at least a portion of the secret key K', masking the value of the certificate (S) by means of the mask M to provide a second layer of security such that only the masked value (Sm) of the certificate (5) is made available to the electronic chip (2), and using the electronic chip (2) to verify the masked value (Sm) of the certificate (S) computed by the application (1).

19. A method according to claim 18, wherein the seed R is determined by the electronic chip (2) from a random number generated by the&electronic chip (2) and wherein the seed R is transmitted to the application (1) by the electronic chip (2).

20. A method according to claim 18, wherein the seed R is determined from a series of consecutive integers generated by the application (1) and by the electronic chip (2).

* * * * *